R. W. G. STUTZKE.
PROCESS OF DRYING SOLIDS.
APPLICATION FILED MAR. 28, 1917.

1,329,813.

Patented Feb. 3, 1920.
2 SHEETS—SHEET 1.

Witnesses:

Inventor:
Richard W. G. Stutzke,
By Dyrenforth, Lee, Chritton and Wiles
Attys.

R. W. G. STUTZKE.
PROCESS OF DRYING SOLIDS.
APPLICATION FILED MAR. 28, 1917.

1,329,813.

Patented Feb. 3, 1920.
2 SHEETS—SHEET 2.

UNITED STATES PATENT OFFICE.

RICHARD W. G. STUTZKE, OF CHICAGO, ILLINOIS, ASSIGNOR, BY MESNE ASSIGNMENTS, TO THE G. A. BUHL COMPANY, OF CHICAGO, ILLINOIS, A CORPORATION OF ILLINOIS.

PROCESS OF DRYING SOLIDS.

1,329,813.  Specification of Letters Patent.  Patented Feb. 3, 1920.

Application filed March 28, 1917. Serial No. 157,955.

*To all whom it may concern:*

Be it known that I, RICHARD W. G. STUTZKE, a subject of the Emperor of Germany, residing at Chicago, in the county of Cook and State of Illinois, have invented a new and useful Process of Drying Solids, of which the following is a specification.

Figure 1:
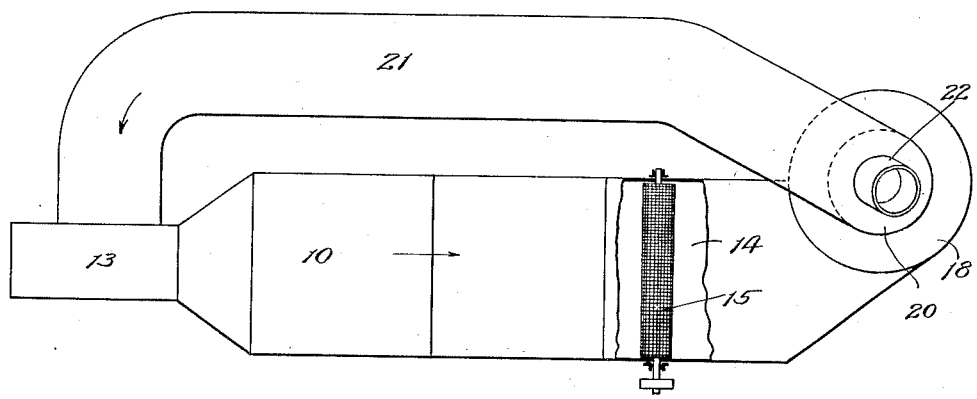
Figure 2:
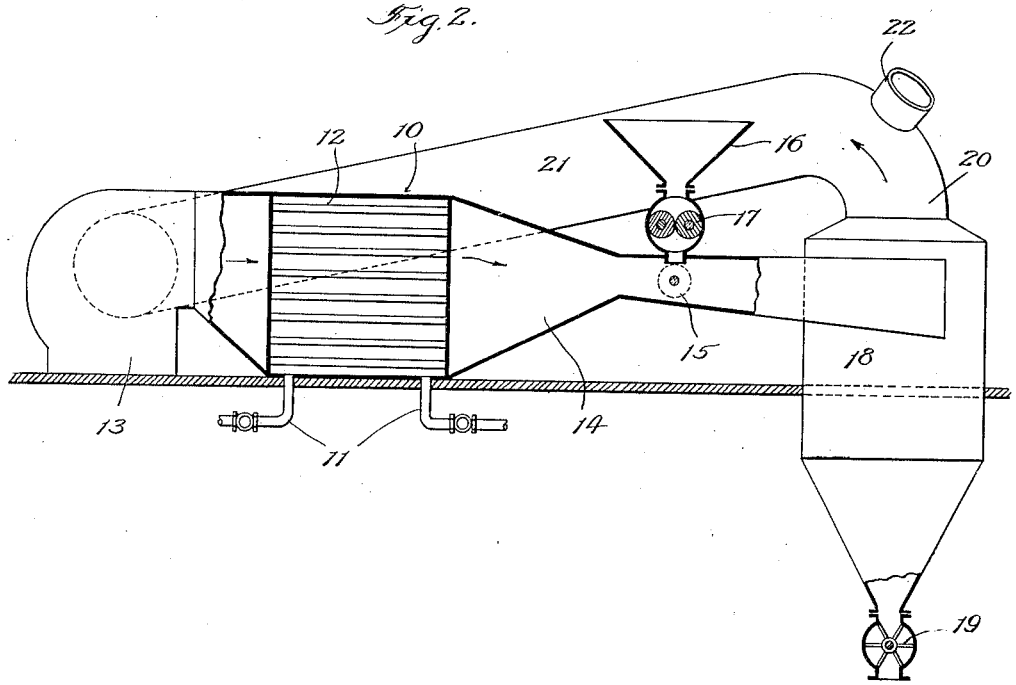

My invention relates to improvements in the art of drying solids, as for example, potatoes or the like materials, and will be fully understood from the following description taken in connection with the accompanying drawings. In these drawings, Figure 1 is a plan view of a drying apparatus constructed in accordance with my invention, a portion of the apparatus being broken away; Fig. 2 is a section on the line 2 of Fig. 1; and Fig. 3 is a similar section through a modified form of the apparatus.

Referring more particularly to the drawings, the numeral 10 designates a tubular heater in the form of a heating chamber adapted to be supplied with a heating fluid, such as steam, through the connections 11 shown and having a plurality of heating pipes 12 passing from end to end thereof horizontally. The said pipes establish communication between the outlet side of a circulating blower 13 and a drying chamber 14. The latter member is preferably of the venturi-like form shown in Fig. 2. Just beyond the narrowest portion or throat of the drying chamber there is journaled horizontally a roll 15, a surface of which is formed of foraminous material, such as woven wire of fine mesh. The means for introducing the solid to be dried is mounted directly above the roller 15 and may comprise a feed-hopper 16, discharging into crushing or disintegrating rolls 17, which latter members in turn discharge through a suitable aperture onto the upper surface of the roll 15.

Beyond the roll 15 the drying chamber connects with the tangential inlet of the cyclone-collector 18, which may be provided at the bottom with a self-sealing dumping gate 19 and at the top with the usual axial outlet 20. A return conduit 21 connects the cyclone outlet 20 with the inlet side of the circulating blower 13, this return conduit being provided with a vent 22, which may open directly to the atmosphere or to a condenser, vacuum pump, pressure controlling valve, or other mechanism, depending upon the character of the process which is to be carried out within the apparatus, as will later appear.

Figure 3:
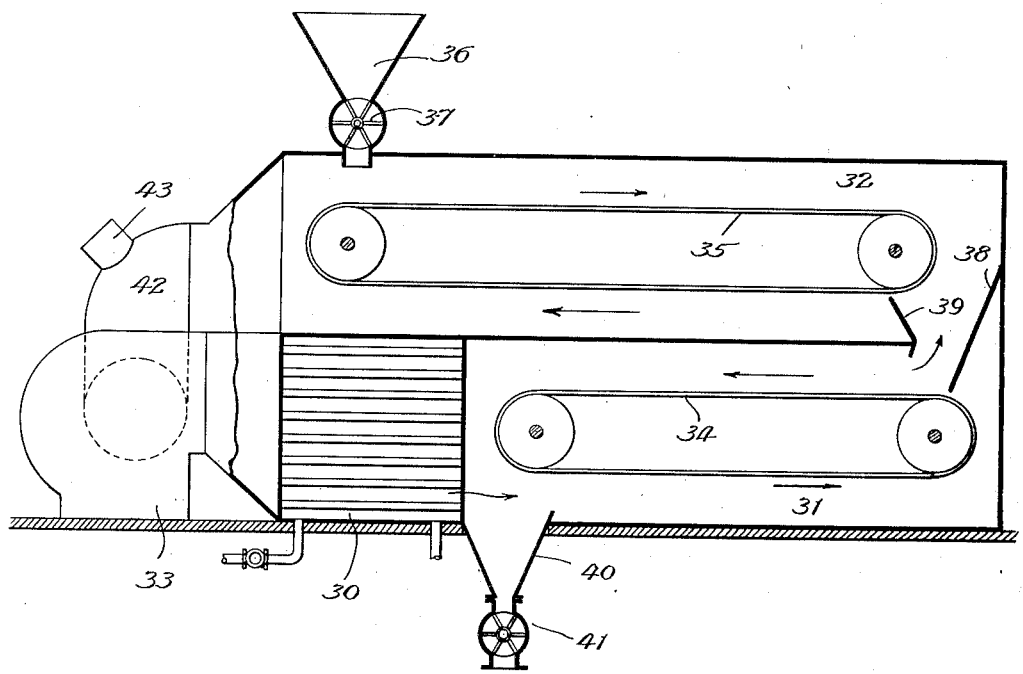

In Fig. 3 there is illustrated a modified form of apparatus comprising a circulating blower 33, discharging into a heater 30. In this construction, however, the venturi-shaped drying chamber and cyclone-collector together are replaced by a double-deck drying chamber, the sections of which, designated 31 and 32, respectively, are provided with endless belt conveyers 34 and 35 arranged to travel in the directions designated by the arrows in the drawing. The feed-hopper 36 is superimposed upon the upper section 32 of the drying chamber at the outlet end thereof. In place of discharging into crushing or disintegrating rolls this feed-hopper has at its outlet end a rotatable feeding gate 37, bearing a sufficient number of arms to be self-sealing. Plates 38, 39 mounted below the righthand end of the upper conveyer 35 form a chute to project the material discharged therefrom onto the surface of the lower conveyer 34. At the discharge end of the latter, which is the inlet end of the drying chamber 31, there is provided a collecting hopper 40, from which the material may be removed by a gate 41.

The outlet end of the drying chamber 32 is connected with the inlet side of the fan 33 by an elbow 42, this connection being vented as at 43.

Both forms of the apparatus heretofore described are designed to effect the drying of solid materials by the use of a circulating current of superheated vapors, in accordance with the principles of my Patent No. 1,215,889.

The operation of the apparatus illustrated in Figs. 1 and 2 is as follows: The material to be dried, for example, potatoes, is introduced into the hopper 16, from which it feeds by gravity to the crushing and disintegrating rolls 17. In passing through the latter the potatoes are reduced to the form of pulp, which is discharged upon the surface of the revolving cylinder 15. By reason of the foraminous construction of the latter the current of superheated vapors passing through the chamber 14 in the direction indicated by the arrows is permitted to reach every part of the pulp upon the roller or cylinder. The venturi-like construction of the drying chamber is of advantage in that with a minimum obstruction to the flow the vapors are given an exceedingly high velocity at the point of entrance of the pulp, this high velocity causing them to pass completely through the roll to dry the material thereon and carry it in suspension to the cyclone collector 18. In this latter member the dried solid is deposited while the vapors pass outwardly from the axial outlet 20 and by the conduit 21 and blower 13 are returned to the heater 10, there to be superheated and again passed through the drying chamber.

The moisture absorbed by the current of superheated vapors from the material to be dried lowers the temperature, decreases the superheat, and increases the volume of the said vapors. This increase in volume of the vapors within the closed system would normally tend to create a rise in pressure therein, which tendency is offset by continuously venting from the system, as from the vent orifice 32, a predetermined proportion of the vapor stream, as is more fully pointed out in my prior patent referred to. The closed system within which the drying is conducted may be operated under atmospheric, super-atmospheric or sub-atmospheric pressure by properly controlling the venting of vapors from the system. By regulation of the pressure and by a corresponding regulation of the temperature through control of the heater 10 the drying process described may be made to accommodate itself to a wide variety of products. In every instance the drying will be accomplished through the action of the superheated vapors liberated from the solid substance itself.

The form of apparatus illustrated in Fig. 3 is particularly designed for the drying of products which it is not desired to have reduced to a fine state of subdivision. Such products, as for example, potatoes, carrots, apples, meat or any other moisture-containing solid, may be cut or chopped into lumps of any reasonable size, and by the action of the feeding gate 37 this relatively coarse material may be introduced at a predetermined rate onto the surface of the conveyer belt 35. By properly regulating the linear velocity of the latter the material to be dried may be subjected to the action of the superheated vapors for a considerable period of time. From the end of the belt 35 the material discharges onto the second belt 34, the speed of which may likewise be adjusted to increase or diminish the drying period. The dried material discharged from the end of the belt 34 is received by the hopper 40 and may be continuously or intermittently removed from the system through the gate 41.

The method of drying solid materials above described is of peculiar advantage in that the drying is accomplished under such conditions as to avoid all chance of oxidation, infection, overheating, or other undesirable incidents. Since the drying is accomplished within a closed system heat losses are reduced to a minimum and the efficiency of the apparatus thereby increased. It is to be particularly noted that the substances to be dried may not at any time reach any temperature exceeding the temperature of the circulating current of superheated vapors, and by reason of the simplicity of control this maximum temperature may be nicely adjusted to suit the characteristics of the product under treatment. Thus, if it is desired to effect simple drying, without any cooking or chemical change whatever the system may be operated under atmospheric or sub-atmospheric pressures, the maximum temperature of the circulating vapors being thus kept below any point at which the cooking or chemical change would take place. Similarly, drying and cooking or other chemical change may be effected simultaneously by the employment of high superheat temperatures, the entire system being maintained under pressure if desired. The use of high superheat temperatures does not necessarily require the use of pressure, the pressure serving only to increase the density of the circulating medium and proportionately increase its available heat units per unit volume.

While I have shown and described in considerable detail two specific embodiments of my invention and the manner of carrying out my improved drying process by the use of these forms of the apparatus, it is to be understood that such detail is only for the purpose of making the invention more clear and is not to be regarded as limiting the scope of the invention, except in so far as such limitations are included within the terms of the accompanying claims, in which it is my intention to claim all novelty inherent in my invention as broadly as is permissible in view of the prior art.

What I claim as new and desire to secure by Letters Patent is:

1. The process of drying solids which consists in continuously introducing such solids into a closed system through which there is set up a circulation of vapors, superheating the said vapors during their circulation and venting the system to limit rise of pressure therein.

2. The process of drying solids which consists in continuously introducing such solids into a closed system through which there is set up a circulation of vapors, superheating the said vapors during their circulation, venting the system to limit rise of pressure therein, and continuously removing the dried solids from the system.

3. The process of drying solid materials of the character described which comprises the continuous introduction of such materials into a closed system, setting up a circulation of vapors within said system, superheating the said vapors during their circulation, and removing the dried solids from the system.

4. The proces of drying solids of the character described which consists in disintegrating the said solids, feeding the disintegrated solids into a closed system, setting up a circulation of vapors within the system, superheating the circulating vapors, and collecting the dried, disintegrated solids within the system.

5. The process of drying solids which consists in introducing such solids into a closed system, conveying them through the said system, setting up a circulation of vapors within the system, superheating the circulating vapors, and discharging the dried solids from the system.

6. The process of drying solids which consists in feeding the said solids into a closed system, conveying them through the said system, setting up a circulation of vapors within the system in a direction opposite the direction of movement of the solids therein, superheating the vapors during their circulation, and discharging the dried solids from the system.

RICHARD W. G. STUTZKE.